April 22, 1958  J. E. NAUTA  2,831,663
MIXING DEVICE WITH A CONICAL MIXING VESSEL AND AT
LEAST TWO REVOLVING MIXING MEMBERS
Filed May 17, 1955  2 Sheets-Sheet 2

United States Patent Office 2,831,663
Patented Apr. 22, 1958

2,831,663

MIXING DEVICE WITH A CONICAL MIXING VESSEL AND AT LEAST TWO REVOLVING MIXING MEMBERS

Johannes Ewardus Nauta, Overveen, Netherlands

Application May 17, 1955, Serial No. 509,058

Claims priority, application Netherlands May 29, 1954

2 Claims. (Cl. 259—102)

The invention relates to a mixing device consisting of a mixing vessel tapering downwards and at least two mixing members which are rotatable around their own center lines, the center lines of said mixing members being able to revolve about the center line of the vessel, while the mixing members move along the inner wall of the vessel. Mixing devices of this kind are already known. In all known mixing devices with a conical mixing vessel and a mixing member revolving around the center line of the vessel the presence of a bearing for a mixing member at the bottom of the vessel presents difficulties, and for this reason, in small mixing vessels of this kind the mixing member is supported entirely outside the vessel. For large mixers however this will give rise to too great bending moments in the mixing members.

It is an object of the invention to provide a supporting and driving arrangement for the mixing members owing to which very large conical mixing vessels may be also used without difficulties. According to the invention a mixer comprises a mixing vessel having a side wall substantially in the shape of a frustum of a downwardly cone and a bottom, a frame at the upper end of the vessel arranged for rotation about the axis of the cone relative to the vessel, a depending column rigidly attached to the frame and extending substantially in axial alignment with the axis of the cone, at least two upper bearings rigidly attached to the frame and arranged in substantially the same radially space relation to the column, an equal number of lower bearings rigidly attached to the lower extremity of the column and an equal number of mixing elements, each mixing element being rotatably supported by one upper bearing and one lower bearing, the line joining the upper bearings of two of the mixing elements being disposed a substantial distance from the column, while the lower bearings of the two mixing elements are spaced from the column by substantially smaller radial distances than those between the upper bearings and the column, each of the two mixing elements functioning to prevent a change in the axial distance between the corresponding upper and lower bearings in at least one direction, and the lower end of the column being free from the bottom and the side wall of the mixing vessel.

Further features and details will be hereinafter more fully described with reference to the accompanying drawings in which some preferred embodiments of the device according to the invention have been illustrated by way of example and in which.

Figures 1, 3:
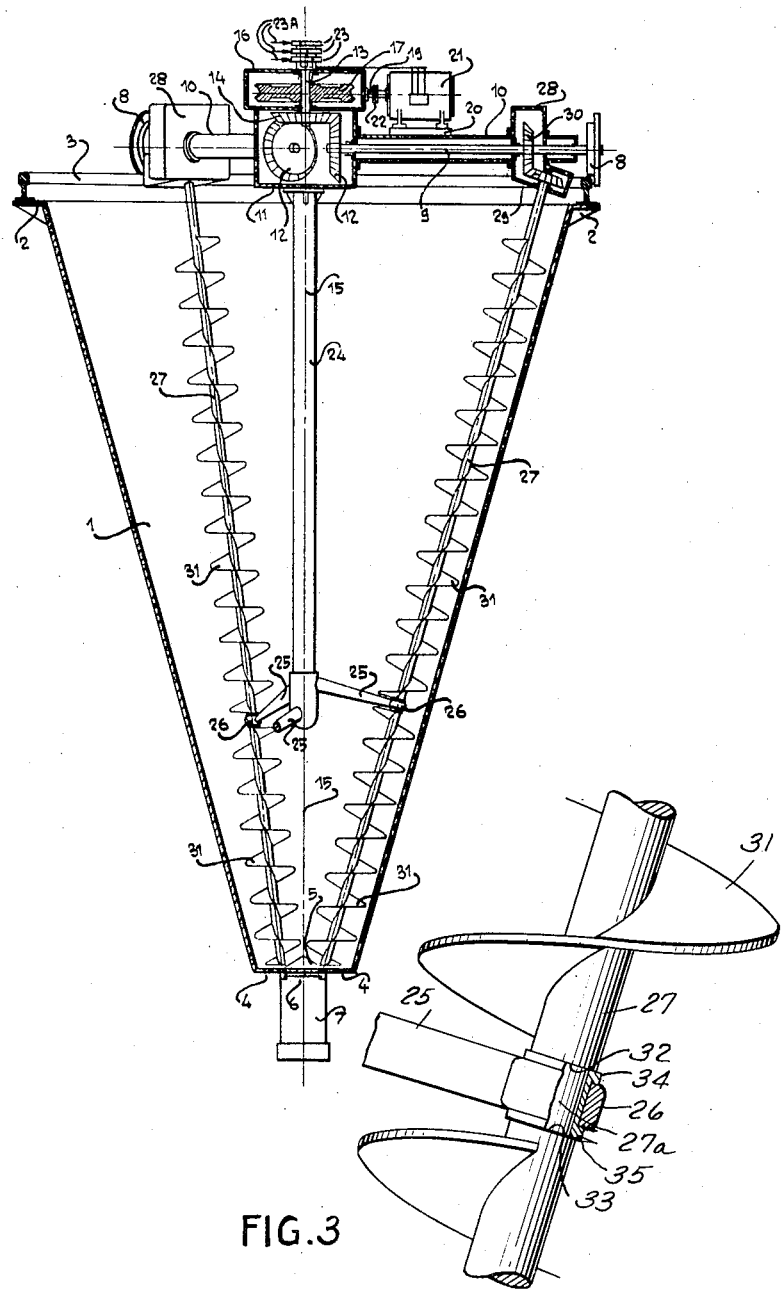
Fig. 1 shows a vertical section through a mixing device with a conical vessel provided with three mixing members.
Fig. 3 is an enlarged detail view of a part of Fig. 1.
Figure 2:
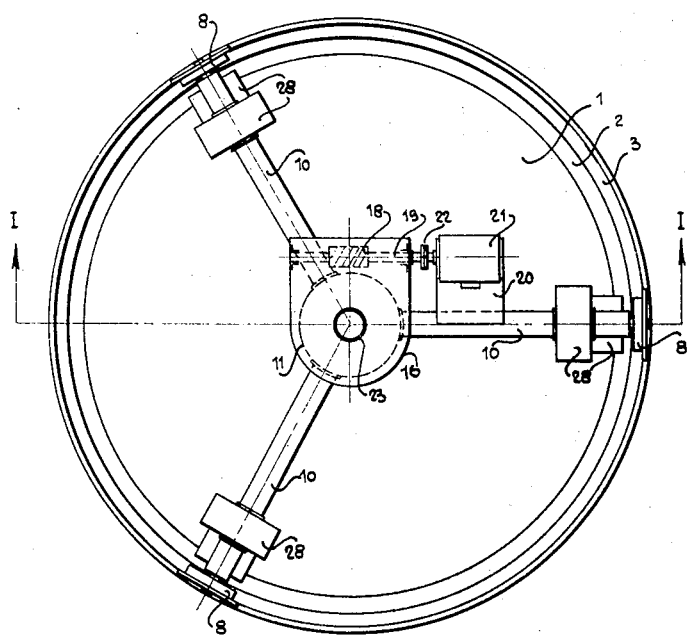
Fig. 2 shows a plan view of the same mixing device.

Referring to the drawings in detail, it will be seen that the illustrated mixing device has a mixing vessel with a conical wall 1 and a flat ring 2 fixed to the upper edge of this wall, said ring resting e. g. upon a floor and carrying the vessel in this way. On the ring 2 is fastened a circular rail 3. The narrow lower extremity of the vessel has a flat bottom 4 with a conical central portion 5 extending upwards. In the flat bottom 4 one or more openings are provided, each of which may be closed by a sliding valve 6. When a sliding valve 6 is opened the contents of the vessel are conveyed in a stream through an outlet pipe 7.

Three wheels 8 provided with flanges rest upon the rail 3, said wheels being fixed to horizontal shafts 9.

Each shaft 9 is supported in one of the three arms 10 of a frame having a central part 11 with which the arms 10 are fixedly connected. The shafts 9 extend to the central part 11 consisting of a toothed wheel box at the inside of which each shaft 9 carries a conical toothed wheel 12. Said three equal toothed wheels 12 are driven by a conical toothed wheel 14 rotatable around a vertical shaft 13. The center line of the shaft 13 coincides with the center line 15 of the conical vessel 1. The shaft 13 carries a worm wheel 17 at the inside of a worm gear casing 16 which is situated above the toothed wheel box 11, and the worm wheel 17 is driven by means of a worm 18 upon a horizontal axle 19. The shaft 13 and the axle 19 are supported in the worm gear casing 16. On one of the arms 10 a supporting plate 20 is fixed on which an electric motor is mounted. The shaft of this motor is directly coupled with the axle 19 by means of a coupling 22. When the motor 21 runs, the worm wheel 17 is driven by the worm 18, so that the toothed wheels 12 are driven by the toothed wheel 14 and the wheels 8 begin to rotate. Hence the frame with the arms 10 will rotate around the center line 15 of the vessel. As the motor 21 moves with the frame which revolves continuously in the same sense, a system of three collector rings 23 rotating with the frame is provided for the current supply. Three current supplying brushes 23A resting upon these collector rings are mounted in holders (not shown) fixedly arranged in relation to the vessel 1.

A column 24 in the form of a tube or a bar extends from the bottom of the toothed wheel box 11, the center line of said column coinciding with the center line 15 of the vessel 1. The lower end of the column 24 lying at a considerable height above the bottom 4 of the vessel 1 is provided with three cross arms 25 which are rigidly joined to the column 24 and each carrying a bearing 26 for the axle of a mixing member 27. The upper end of the shaft of each mixing member 27 is supported in the wall of a toothed wheel box 28 carried by a related arm 10 of the frame, and carries a conical toothed wheel 29 which is driven by a conical toothed wheel 30 fixed upon the shaft 9 which extends through said box 28. The consequence is that when the motor 21 runs, not only the frame with the column 24 and the mixing members is rotated around the shaft 15 by movement of the wheels 8, but that also the mixing members themselves rotate around their center lines. The shafts of the mixing members 27 are provided with screw blades 31 except at the upper end and in close proximity to the bearings 26 and rotate in such a direction that the material in the vessel 1 is conveyed upwards by these blades. The bearings 26 are held against axial sliding relative to the shafts 27; likewise the upper end of each shaft 27 is held against sliding in the longitudinal direction in the related box 28.

Figure 4:
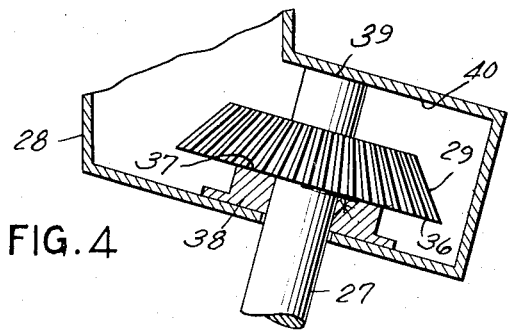
Fig. 4 is an enlarged detail view of another part of Fig. 1.

For example, as seen in Fig. 3, axial movement of each shaft 27 with respect to the related lower bearing 26 may be prevented by providing the shaft with a reduced diameter portion 27a received in the bearing so that annular, confronting radial shoulders 32 and 33 are defined at the opposite ends of the reduced diameter portion 27a abutting axially against the adjacent end faces 34 and 35 of the bearing 26. Further, by way of example, axial movement of the upper end of each shaft 27 with respect to the related box 28 may, as seen in Fig. 4, be prevented by arranging the bevel gear 29 fixed on the shaft 27 within the box 28 so that the under surface 36 of the gear abuts axially against the end face 37 of the bearing 38 in which the shaft 27 is journalled, while the upper end face 39 of the shaft 27 abuts axially against the under surface 40 of the top wall of box 28. As a result of the above, a horizontal force exerted at the lower end of a mixing member and situated in a plane through the shaft 15 may cause only small bending moments in the mixing members and the column 24, as the shafts 27 of the mixing members cooperate as truss members and are able to transfer tensile and compressive stresses with the supporting device constituted by the column 24 and the cross arms 25. At the same time the construction strongly resists those forces which cause a deformation tending to move the mixing members toward the wall of the vessel 1. In the short cross arms 25 which preferably have to be not too thick in connection with their movement across the material to be mixed, bending moments will occur which make it desirable to make them from a high grade material.

At the upper side of the vessel 1 the angular spacing between the mixing members is 120°. This might also be the case at the lower side, but as is shown in Fig. 1 the lower ends may also coincide with the center line 15. In that case the mixing member not visible in Fig. 1 is not able to extend all the way to the bottom of the vessel, which is no drawback.

Although it is shown for simplicity's sake that the wheels 8 are directly mounted on the shafts 9, it will be more favourable to drive the wheels 8 via retarding or step down transmissions which may be placed in the boxes 28, for preferably the rotation of the frame around the center line 15 is rather slow.

It is favourable to arrange all of the bearings 26 not at the same height, for by that it will be obtained that while mixing and emptying no inadmissible quantity of material may be left behind on the wall.

It will be evident that the favourable resistance to lateral forces remains in existence in the device described, in case instead of three mixing members only two mixing members are applied, so long as the line connecting the upper ends of the mixing members is disposed a substantial radial distance from the center line 15. Of course also four or more mixing members moving along the wall may be used in principle. In general not all of them will extend all the way to the bottom of the vessel.

What I claim is:

1. A mixer comprising in combination: a mixing vessel having a sidewall substantially in the shape of a frustum of a downwardly tapering cone and a bottom, a frame at the upper end of said vessel and arranged for rotation about the axis of said cone with regard to said vessel, a depending column rigidly attached to said frame and extending substantially in axial alignment with the axis of said cone, at least two upper bearings rigidly attached to said frame and arranged in substantially the same radially spaced relation to said column, an equal number of lower bearings rigidly attached to the lower extremity of said column and an equal number of mixing elements, each mixing element being rotatably supported by one upper bearing and one lower bearing and being non-slidable longitudinally with respect to the related upper and lower bearings, the line joining the upper bearings of two of said mixing elements being disposed a substantial distance from said column, while the lower bearings of said two mixing elements are spaced from said column by radial distances that are substantially smaller than said radial distances from said upper bearings to said column, each of said two mixing elements functioning to prevent a change in the axial distance between the corresponding upper and lower bearings in at least one direction by reason of the longitudinally non-slidable relationship between each mixing element and the corresponding bearings, the lower end of said column being free from the bottom and the side wall of the mixing vessel.

2. A mixer as in claim 1; wherein each of said two mixing elements has abutment surfaces facing in opposed axial directions in the regions of the related upper and lower bearings, and said upper and lower bearings of said two mixing elements have abutment surfaces axially confronting said abutment surfaces of the related mixing elements for performing said function of preventing a change in the axial distance between the upper and lower bearings.

References Cited in the file of this patent
UNITED STATES PATENTS

| | | |
|---|---|---|
| 229,932 | Witsil | July 13, 1880 |
| 410,198 | Rieseck | Sept. 3, 1889 |
| 2,668,764 | Nauta | Feb. 9, 1954 |

FOREIGN PATENTS

| | | |
|---|---|---|
| 579,658 | Germany | June 29, 1933 |